United States Patent
Lyu et al.

(10) Patent No.: US 10,404,064 B2
(45) Date of Patent: Sep. 3, 2019

(54) MODULAR MULTILEVEL CONVERTER CAPACITOR VOLTAGE RIPPLE REDUCTION

(71) Applicant: Virginia Tech Intellectual Properties, Inc., Blacksburg, VA (US)

(72) Inventors: Yadong Lyu, Blacksburg, VA (US); Yi-Hsun Hsieh, Blacksburg, VA (US); Fred C. Lee, Blacksburg, VA (US); Qiang Li, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 383 days.

(21) Appl. No.: 15/239,165

(22) Filed: Aug. 17, 2016

(65) Prior Publication Data
US 2017/0054294 A1 Feb. 23, 2017

Related U.S. Application Data

(60) Provisional application No. 62/206,336, filed on Aug. 18, 2015.

(51) Int. Cl.
*H02J 3/01* (2006.01)
*H02M 1/15* (2006.01)
(Continued)

(52) U.S. Cl.
CPC .............. *H02J 3/01* (2013.01); *H02M 1/15* (2013.01); *H02J 5/00* (2013.01); *H02M 2007/4835* (2013.01)

(58) Field of Classification Search
CPC .... H02J 3/01; H02J 5/00; H02M 1/15; H02M 2007/4835
(Continued)

(56) References Cited

U.S. PATENT DOCUMENTS

| 8,704,498 B2 * | 4/2014 | Trainer ................ H02M 7/483 323/207 |
| 8,717,787 B2 | 5/2014 | Winkelnkemper et al. |

(Continued)

OTHER PUBLICATIONS

Modeling and design of modular multilevel converter for grid application, Kalle lives, 2014.*
(Continued)

*Primary Examiner* — Daniel Kessie
*Assistant Examiner* — Swarna N Chowdhuri
(74) *Attorney, Agent, or Firm* — Thomas | Horstemeyer, LLP; John S. Sears; Jason M. Perilla

(57) ABSTRACT

Aspects of capacitor voltage ripple reduction in modular multilevel converters are described herein. In one embodiment, a power converter system includes a modular multilevel converter (MMC) electrically coupled and configured to convert power between two different power systems. The MMC includes one or more phase legs having a cascade arrangement of switching submodules, where the switching submodules include an arrangement of switching power transistors and capacitors. The MMC further includes a control loop including a differential mode control loop and a common mode control loop. The differential control loop is configured to generate a differential control signal based on a target modulation index to reduce fundamental components of voltage ripple on the capacitors, and the common mode control loop is configured to inject $2^{nd}$ order harmonic current into a common mode control signal to reduce $2^{nd}$ order harmonic components of the voltage ripple on the capacitors.

20 Claims, 11 Drawing Sheets

(51) Int. Cl.
*H02J 5/00* (2016.01)
*H02M 7/483* (2007.01)

(58) Field of Classification Search
USPC .......................................................... 307/72
See application file for complete search history.

(56) References Cited

U.S. PATENT DOCUMENTS

| 2015/0003134 A1* | 1/2015 | Trainer | H02J 3/36 |
| | | | 363/132 |
| 2015/0162848 A1* | 6/2015 | Hamefors | H02J 3/1814 |
| | | | 363/78 |
| 2016/0268915 A1* | 9/2016 | Lin | H02M 1/32 |
| 2017/0170658 A1* | 6/2017 | Tengner | H02J 3/1857 |
| 2018/0026519 A1* | 1/2018 | Tengner | H02J 3/32 |
| | | | 320/137 |
| 2018/0138826 A1* | 5/2018 | Jimichi | H02M 1/32 |

OTHER PUBLICATIONS

Winkelnkemper, Manfred, Arthur Korn, and Peter Steimer. "A modular direct converter for transformerless rail interties." Industrial Electronics (ISIE), 2010 IEEE International Symposium on. IEEE, 2010.

Pou, Josep, et al. "Circulating current injection methods based on instantaneous information for the modular multilevel converter." IEEE Transactions on Industrial Electronics 62.2 (2015): 777-788.

Korn, Arthur J., Manfred Winkelnkemper, and Peter Steimer. "Low output frequency operation of the modular multi-level converter." Energy Conversion Congress and Exposition (ECCE), 2010 IEEE. IEEE, 2010.

Kolb, Johannes, Felix Kammerer, and Michael Braun. "Straight forward vector control of the modular multilevel converter for feeding three-phase machines over their complete frequency range." IECON 2011—37th Annual Conference on IEEE Industrial Electronics Society. IEEE, 2011.

Wang, Kui, et al. "Voltage balancing and fluctuation-suppression methods of floating capacitors in a new modular multilevel converter." IEEE Transactions on Industrial Electronics 60.5 (2013): 1943-1954.

Wang, Jun, et al. "Power-cell switching-cycle capacitor voltage control for the Modular Multilevel Converters." Power Electronics Conference (IPEC-Hiroshima 2014-ECCE-ASIA), 2014 International. IEEE, 2014.

Ilves, Kalle, et al. "Semi-full-bridge submodule for modular multilevel converters." Power Electronics and ECCE Asia (ICPE-ECCE Asia), 2015 9th International Conference on. IEEE, 2015.

Zeng, Rong, et al. "Design and operation of a hybrid modular multilevel converter." IEEE Transactions on Power Electronics 30.3 (2015): 1137-1146.

* cited by examiner

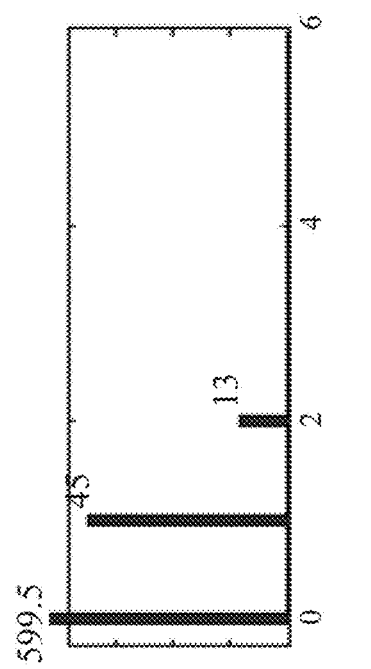
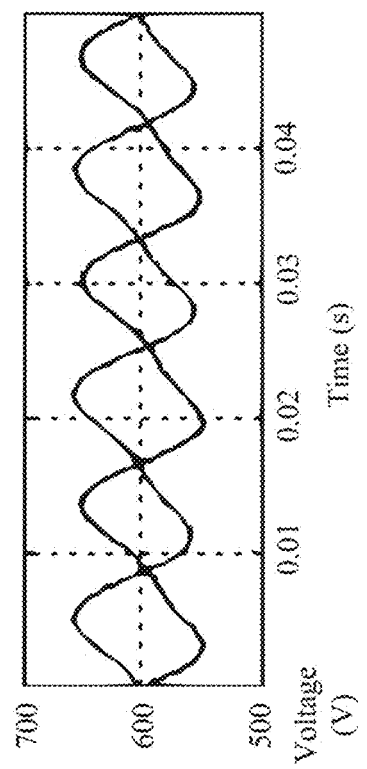
FIG. 3B
FIG. 3A

MODULAR MULTILEVEL CONVERTER CAPACITOR VOLTAGE RIPPLE REDUCTION

CROSS-REFERENCE TO RELATED APPLICATIONS

This application claims the benefit of U.S. Provisional Application No. 62/206,336, filed Aug. 18, 2015, the entire contents of which are hereby incorporated herein by reference.

BACKGROUND

A modular multilevel converter (MMC) is a transformerless power converter suitable for use in high- or medium-voltage power conversion applications. MMCs include a cascade connection of multiple switching submodules each having a power-storing capacitor that floats in the cascade connection. Thus, in the control of an MMC, it is necessary to individually voltage-balance and control floating capacitors in the switching submodules. The switching submodules can be constructed using various configurations of switching power transistors, such as half bridge and full bridge topologies, among others. To control the output of an MMC, the switching power transistors can be controlled using switching control signals generated by an MMC controller.

A significant amount of research has been conducted to mitigate various problems with MMC control, including the reduction of voltage ripple on the capacitors in the switching submodules. Some methods are relatively unsuitable for high voltage, high power applications, however, for various reasons. For example, some methods are unsuitable because they cause relatively large arm currents.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIG. 3A illustrates an example of capacitor voltage ripple in an MMC including full bridge or half bridge switching submodules under conventional control according to various examples described herein.

FIG. 3B illustrates an example spectrum of an MMC including full bridge or half bridge switching submodules under conventional control according to various examples described herein.

DETAILED DESCRIPTION

Figure 1:
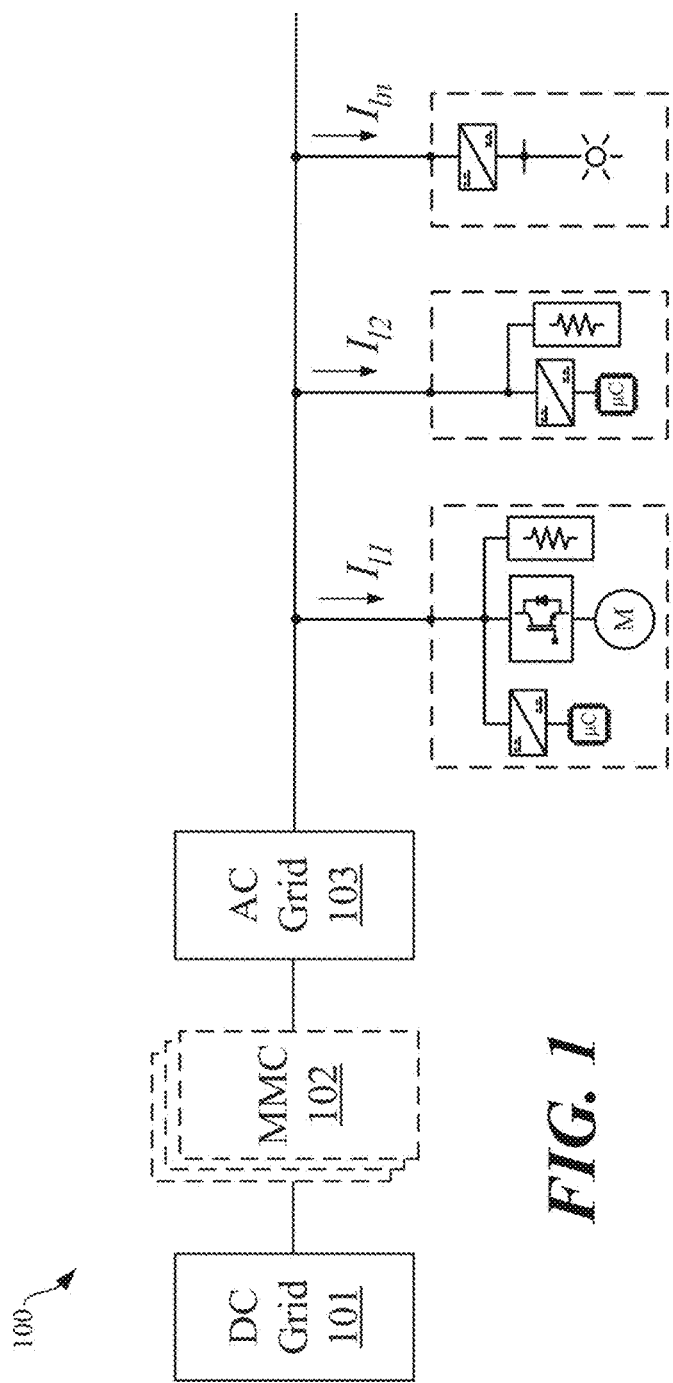
FIG. 1 illustrates a system including a direct current (DC) grid or power system, a modular multilevel converter (MMC), and an alternating current (AC) grid or power system according to various examples described herein.

Modular Multilevel Converters (MMC) can be used in power converter systems to convert direct current (DC) at high voltages into alternating current (AC) at high voltages, for example, without a transformer and are becoming attractive solutions for high voltage, high power applications. Transformerless unidirectional or bidirectional AC-DC interface power converter systems have been proposed, for example, to connect DC nanogrids to AC utility grids. Compared with isolated topologies, the non-isolated topology of transformerless AC-DC interface power converter systems is relatively simpler and generally more efficient. One of the challenges of using an MMC for these applications can be to minimize capacitor voltage ripple in the switching submodules of the MMC. A conventional approach of using a large capacitance in the switching submodules can increase the volume and cost of MMCs.

In the context outlined above, aspects of capacitor voltage ripple reduction in modular multilevel converters are described herein. In one embodiment, a power converter system includes a modular multilevel converter (MMC) electrically coupled and configured to convert power between two different power systems. The MMC includes one or more phase legs having a cascade arrangement of switching submodules, where the switching submodules include an arrangement of switching power transistors and capacitors. The MMC further includes a control loop including a differential mode control loop and a common mode control loop. The differential control loop is configured to generate a differential control signal based on a target modulation index to reduce fundamental components of voltage ripple on the capacitors, and the common mode control loop is configured to inject $2^{nd}$ order harmonic current into a common mode control signal to reduce $2^{nd}$ order harmonic components of the voltage ripple on the capacitors.

The concepts described herein can be used to significantly reduce capacitor voltage ripple in switching submodules of an MMC used in power converter systems. One embodiment includes new control systems and design methods for a full bridge MMC to significantly reduce low frequency components in capacitor voltage ripple based on a target modulation index. Additionally, $2^{nd}$ order current injection can be used to significantly reduce $2^{nd}$ order power in the capacitor voltage ripple. In such configurations, switching submodules can be constructed in various configurations of switching power transistors, such as in full-bridge and semi full bridge topologies, for example, to design a modulation index larger than 1.

Using one approach, an MMC is designed to have a modulation index of about 1.15 and to inject a $2^{nd}$ order current to substantially reduce both the fundamental and $2^{nd}$ order power components of capacitor voltage ripple in switching submodules of the MMC. As a result, only a small $3^{rd}$ order power component of the capacitor voltage ripple is left in the switching submodules. Using another hybrid MMC approach, a voltage can be injected into the control loop for the switching submodules such that the modulation index can be greater than 1 while the voltage of one or more half bridge switching submodules is still greater than zero.

Turning to the drawings, FIG. 1 illustrates a power converter system 100 including a DC power grid or system 101, an MMC 102, and an AC power grid or system 103. The MMC 102 provides a solution for high voltage, high power conversion applications. The MMC 102 can, for example, convert high DC voltage from the DC power system 101 into high AC voltage for the power system 103 without a transformer. It is noted that FIG. 1 illustrates a representative example of the way an MMC can be used to convert power between two different power grids or systems. In other cases, the MMC 102 can convert power between two different AC power systems, two different DC power systems, or other AC and DC power systems.

The amount of capacitor voltage ripple in the switching submodules of the MMC 102 is a relatively important factor when designing and evaluating a power converter system for high voltage, high power applications. High voltage consumer, scientific, medical, military, and industrial applications such as air filtration, imaging, and testing systems often require stable, low ripple and well-regulated output voltages. The amount of capacitor voltage ripple is additionally important when a DC grid is interconnected with an AC grid using a transformerless AC-DC interface converter, for example, for transmission over a high-voltage AC network or grid after conversion from a high-voltage DC transmission system.

Figure 2A:
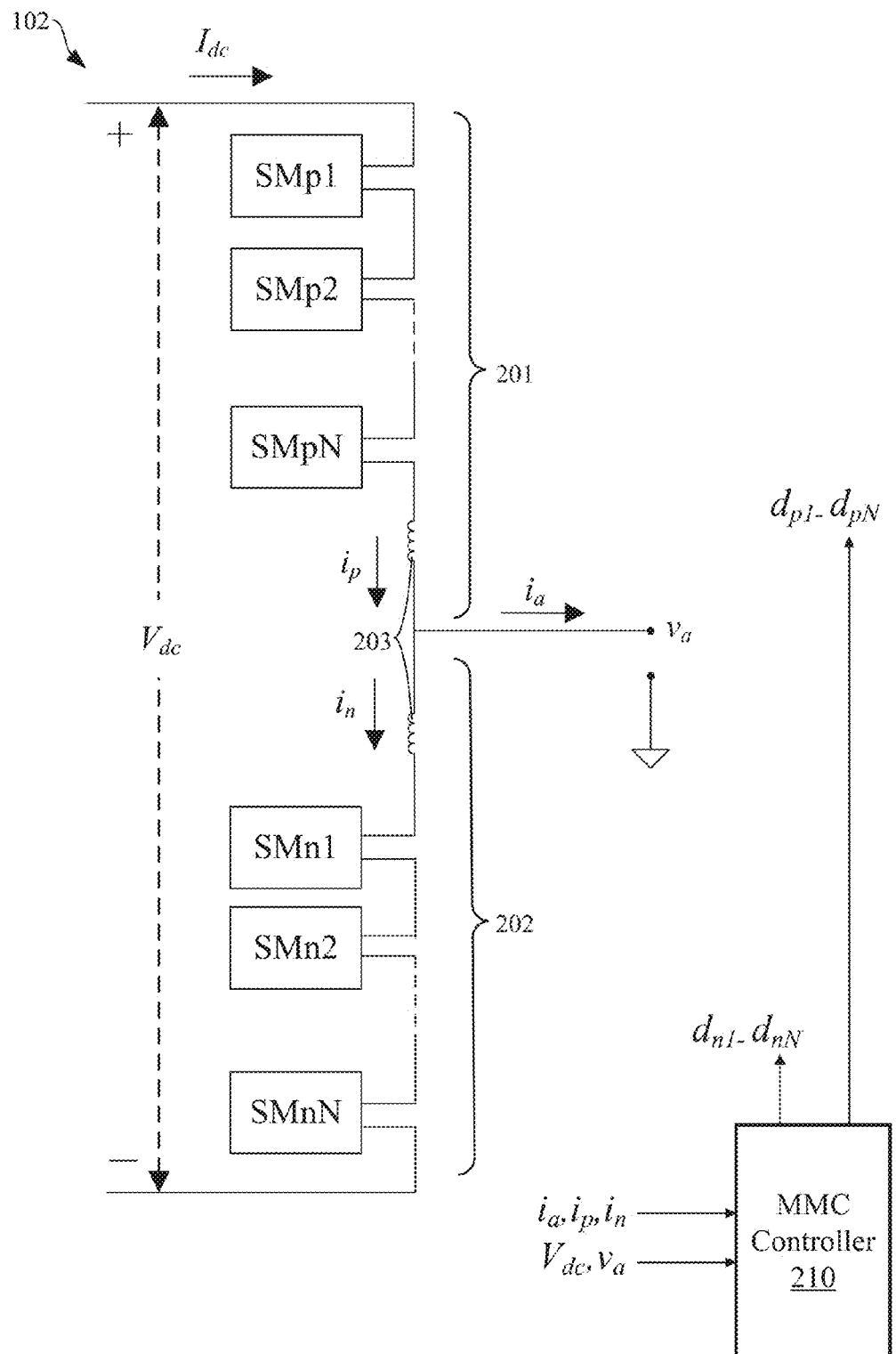
FIG. 2A illustrates a phase leg of an MMC including a cascade connection of switching submodules according to various examples described herein.

FIG. 2A illustrates an example MMC 102 for use in a power converter system similar to that shown in FIG. 1. FIG. 2A shows a structure of a phase leg of the MMC 102 including a number of switching submodules SMp1-SMpN. The MMC 102 is provided as a representative example of an MMC that can incorporate the concepts of modular multilevel converter capacitor voltage ripple reduction described herein. In other embodiments, the concepts described herein can be applied to MMCs having any number of switching submodules and phase legs. Additionally, as discussed below, the concepts can be applied to different topologies of switching submodules, such as those having full bridge, semi full bridge, and half bridge arrangements of switching transistors, among others. Further, the concepts can be applied to various combinations of different arrangements of switching transistors in switching submodules (e.g., hybrid MMCs).

Referring to FIG. 2A, the phase leg of the MMC 102 includes a cascade arrangement of electrically coupled switching submodules SMp1-SMpN and an arm inductor 203. In FIG. 2A, $V_{dc}$ is representative of the output voltage of the DC power system 101 (FIG. 1) and $v_a$ is representative of the output voltage of the AC system 103 (FIG. 1), where $v_a = V_a \cos \omega t$ and $V_a$ is the magnitude or envelope of $v_a$. The AC output current $i_a = I_d \cos \omega t + I_q \sin \omega t$, where $I_d$ represents active current and $I_q$ represents reactive current.

As shown in FIG. 2A, the MMC 102 includes an upper arm 201 of cascaded switching submodules SMp1-SMpN and a lower arm 202 of cascaded switching submodules SMn1-SMnN. Each of the switching submodules SMp1-SMpN includes an arrangement of switching power transistors. As discussed in further detail below with reference to FIG. 2C, the topology of the switching power transistors in any given switching submodule SMp1-SMpN can be full bridge, semi full bridge, half bridge, or another topology.

The MMC 102 also includes an MMC controller 210. As described in further detail below, the MMC controller 210 can be embodied in the form of hardware, firmware, software executable by hardware, or as any combination thereof. The MMC controller 210 can include one or more proportional-integral (PI) controllers in a control feedback loop. As discussed in further detail below with reference to FIGS. 8 and 9, the MMC controller 210 is configured to continuously calculate certain error values as differences between desired operating characteristics of the MMC 102 and measured operating characteristics of the MMC 102, such as the values of $i_a$, $i_p$, $i_n$, $V_{dc}$, and $v_a$, among others, which are described in further detail below with reference to FIG. 2B. Using the error values, the MMC controller 210 can generate the switching control signals $d_{p1}$-$d_{pN}$ and $d_{n1}$-$d_{nN}$. The switching control signals $d_{p1}$-$d_{pN}$ are used to control the switching power transistors in the switching submodules SMp1-SMpN, and the switching control signals $d_{n1}$-$d_{nN}$ are used to control the switching power transistors in the switching submodules SMn1-SMnN.

Figure 2B:
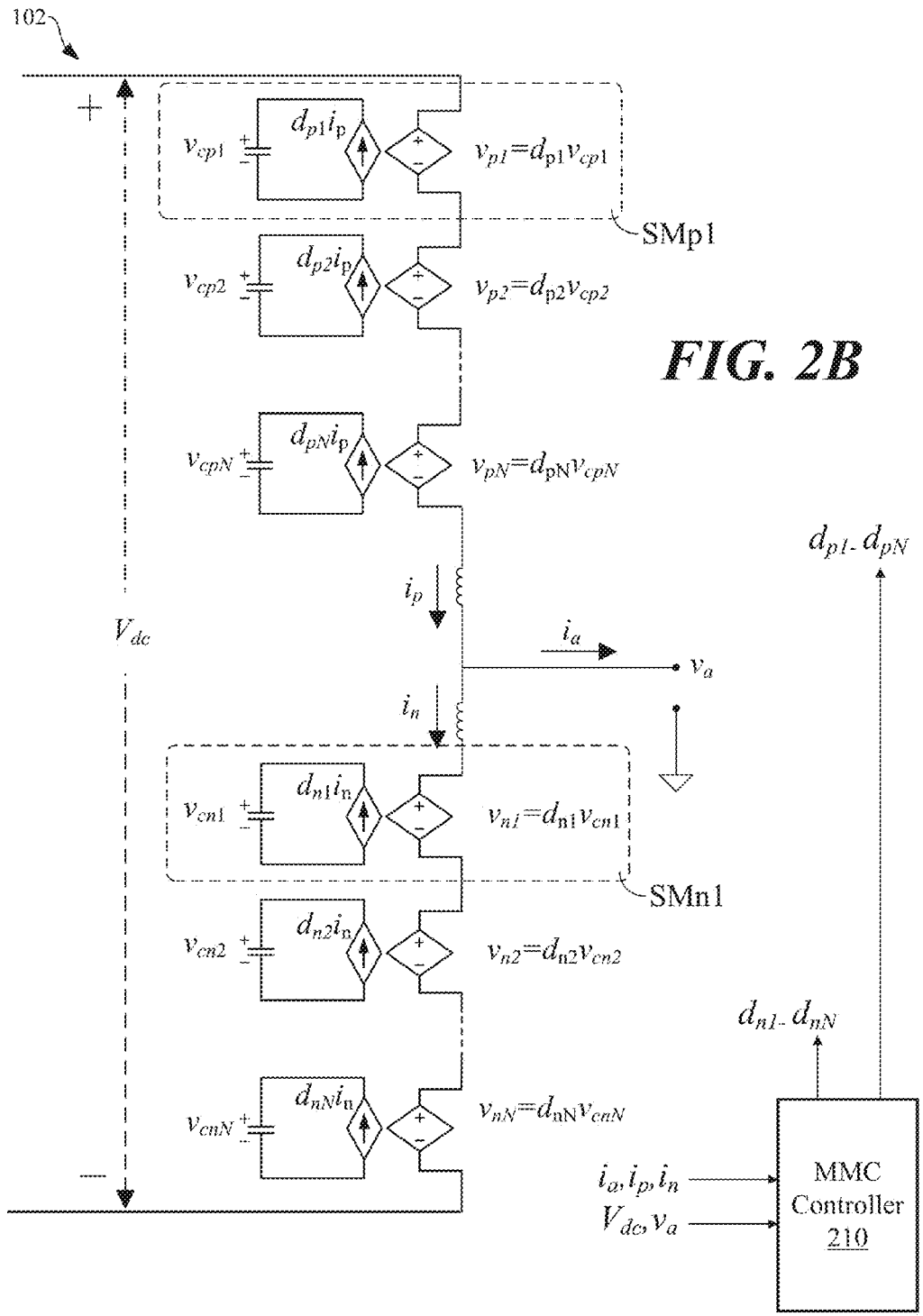
FIG. 2B illustrates an example representative circuit model of the phase leg of the MMC shown in FIG. 2A using control notation according to various examples described herein.

FIG. 2B illustrates an example representative circuit model of the phase leg of the MMC 102 shown in FIG. 2A using control notation. The total output voltage of the cascaded switching submodules SMp1-SMpN and SMn1-SMnN in the upper arm 201 and the lower arm 202, respectively, is $v_p = v_{p1} + v_{p2} + \ldots + v_{pN}$ and $V_n = V_{n1} + V_{n2} + \ldots + V_{nN}$. Because the voltage drop on the arm inductor 203 in the phase leg is so small, it can be ignored, and the voltage equations can be derived as: $v_p = 0.5 V_{dc} - v_a$; $V_n = 0.5 V_{dc} + v_a$ based on Kirchhoffs Voltage Law. Under a conventional approach to control in the field, $i_p = I_{dc} + i_a$ and $i_n = I_{dc} - i_a$, where $i_p$ represents the current in the upper arm 201 and $i_n$ represents current in the lower arm 202.

Using the modulation index $M = 2V_a/V_{dc}$, the total input power of upper arm ($p_p$) and lower arm ($p_n$) is given by:

$$\begin{cases} p_p = i_p v_p = \frac{1}{2} I_d V_a \left( \frac{1}{M} - \frac{M}{2} \right) \cos \omega t - \frac{1}{4} I_d V_a \cos 2\omega t + \\ \qquad \frac{1}{2} I_q V_a \frac{1}{M} \sin \omega t - \frac{1}{4} I_q V_a \sin 2\omega t \\ p_n = i_p v_p = -\frac{1}{2} I_d V_a \left( \frac{1}{M} - \frac{M}{2} \right) \cos \omega t - \frac{1}{4} I_d V_a \cos 2\omega t - \\ \qquad \frac{1}{2} I_q V_a \frac{1}{M} \sin \omega t - \frac{1}{4} I_q V_a \sin 2\omega t \end{cases} \quad (1)$$

Under load, the capacitors in the switching submodules SMp1-SMpN and SMn1-SMnN in the upper arm 201 and the lower arm 202 experience power fluctuations causing capacitor voltage ripple. To suppress this fluctuation, relatively large capacitors can be selected for use in the switching submodules SMp1-SMpN and SMn1-SMnN. The use of large capacitors, however, increases the volume and cost of the MMC 102.

Figure 2C:
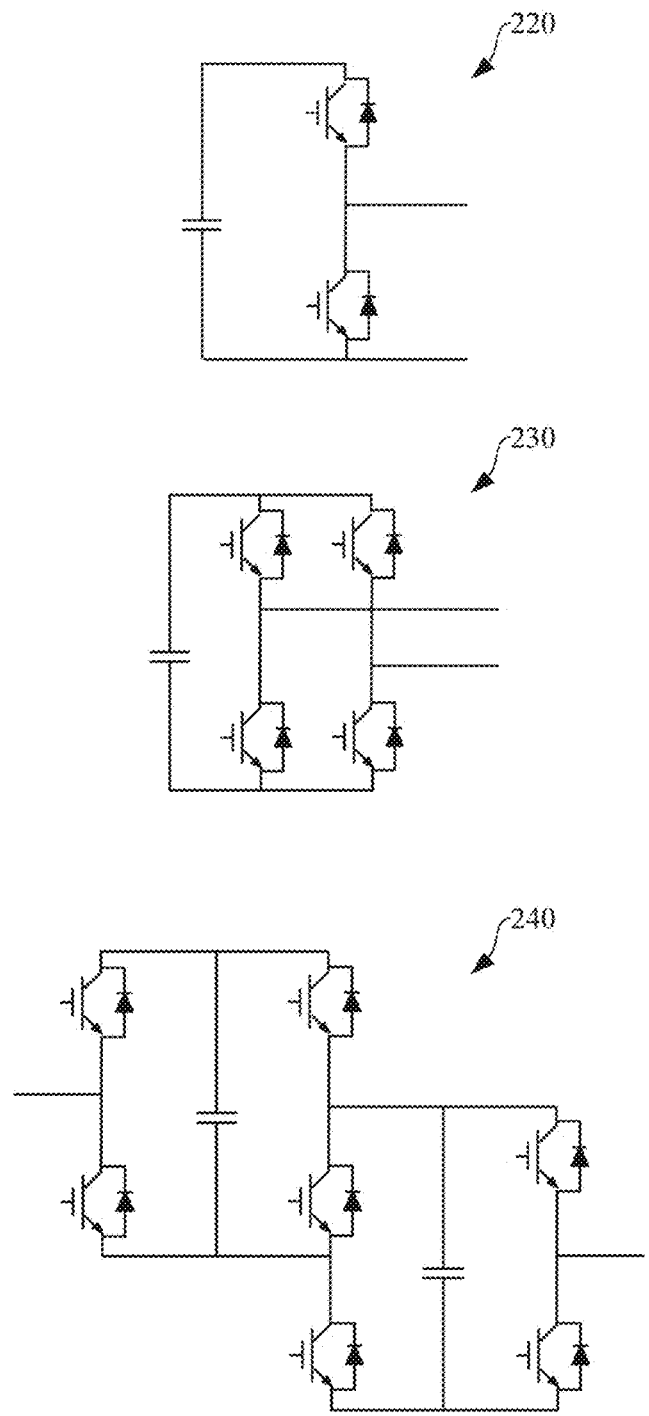
FIG. 2C illustrates example topologies of switching power transistors that can be used in switching submodules of the MMC shown in FIG. 2A according to various examples described herein.

FIG. 2C illustrates example topologies of switching power transistors that can be used in the switching submodules of the MMC 102 shown in FIG. 2A according to various examples described herein. The topologies illustrated in FIG. 2C are provided as examples of the types of topologies that can be used in the switching submodules of the MMC 102 shown in FIG. 2A, but are not intended to be limiting, as other topologies can be used with the concepts described herein.

FIG. 2C illustrates example half bridge 220, full bridge 230, and semi full bridge 240 switching submodule topologies. In various embodiments, the half bridge 220, full bridge 230, and semi full bridge 240 switching submodule topologies can include any suitable type of semiconductor (or other) power switches, such as power bipolar transistors, power metal oxide semiconductor field effect transistors (MOSFETs), or power insulated gate bipolar transistors (IGBTs), among others, for switching power.

As described in further detail below, the full bridge 230 and semi full bridge 240 topologies may be preferred to reduce capacitor voltage ripple because they are capable of outputting a negative voltage with respect to $V_{dc}$. In some cases, however, the MMC 102 can include a combination of one or more of the half bridge 220, the full bridge 230, and the semi full bridge 240. In other words, in some embodiments, the MMC 102 can include a hybrid of different switching submodule topologies.

FIG. 3A illustrates an example of capacitor voltage ripple in an MMC including full bridge or half bridge switching submodules under conventional control, and FIG. 3B illustrates an example spectrum of the MMC including full bridge switching submodules under conventional control. As shown in FIG. 3A, the capacitors in the full bridge switching submodules experience over 100 V of voltage ripple under conventional control. Further, as shown in FIG. 3B, the alternating (i.e., non DC) components of the capacitor voltage ripple are mainly in the fundamental and $2^{nd}$ order components, of which the fundamental component is dominant.

One approach to mitigate various problems with MMC control, including capacitor voltage ripple, includes a method of injecting a $2^{nd}$ order harmonic current $i_{har}(2\omega t)$ control to reduce the $2^{nd}$ order capacitor voltage ripple. This $2^{nd}$ order harmonic current control can be used to adjust the arm currents of both the upper and lower arms of phase legs, so the arm currents can be defined as:

$$\begin{cases} i_p = i_{dc} + i_a + i_{har}(2\omega t) \\ i_n = i_{dc} + i_a + i_{har}(2\omega t) \end{cases} \quad (2)$$

The common part of the current that flows through the upper and lower arms is often referred to as the circulating current $i_{cir}$, and can be defined as:

$$i_{cir} = \frac{i_p + i_n}{2} = I_{dc} + i_{har}(2\omega t). \quad (3)$$

The circulating current $i_{cir}$ does not form part of the output of the MMC, and the harmonic part of the circulating current $i_{cir}$ does not flow back to the input of the MMC. As a result, the harmonic part of circulating current $i_{cir}$ is a control freedom to minimize the capacitor voltage ripple.

On that basis, the module input equations can be updated to:

$$\begin{cases} p_p = \frac{1}{2}i_a V_{dc} - I_{dc}v_a + \frac{1}{2}V_{dc}I_{dc} - v_a i_a + \\ \quad \frac{1}{2}i_{har}(2\omega t)V_{dc} - i_{har}(2\omega t)v_a \\ p_n = -\frac{1}{2}i_a V_{dc} + I_{dc}v_a + \frac{1}{2}V_{dc}I_{dc} - v_a i_a + \\ \quad \frac{1}{2}i_{har}(2\omega t)V_{dc} + i_{har}(2\omega t)v_a \end{cases}, \text{ and} \quad (4)$$

the $2^{nd}$ order part in equation (4) can be compensated with:

$$i_{har}(2\omega t) = \frac{v_a i_a}{2V_{dc}} - I_{dc}. \quad (5)$$

However, the benefit of this method is limited because there is still a significant fundamental component in the capacitor voltage ripple. Another approach includes an optimized $2^{nd}$ order harmonic current injection and $2^{nd}$ plus $4^{th}$ order harmonic current injection, but the effect does not have much difference from that of the $2^{nd}$ order harmonic current injection.

Still another approach includes injecting a higher frequency current component in coordination with a zero-sequence injection to the AC voltage reference to attenuate low frequency ripples in the capacitor voltages. In that approach, a high frequency current is added into both arm currents, so the arm currents are changed to:

$$\begin{cases} i_p = I_{dc} + i_a + i_{har} \\ i_n = I_{dc} - i_a + i_{har} \end{cases}. \quad (6)$$

When the zero-sequence voltage $v_{cm}$ is injected into the AC voltage reference, the arm voltages are changed to:

$$\begin{cases} v_p = 0.5V_{dc} - v_a - v_{cm} \\ v_n = 0.5V_{dc} + v_a + v_{cm} \end{cases}. \quad (7)$$

As a result, the module power equations are:

$$\begin{cases} p_p = \frac{1}{2}i_a V_{dc} - I_{dc}v_a + \frac{1}{2}V_{dc}I_{dc} - v_a i_a + \\ \quad \frac{1}{2}i_{har}V_{dc} - i_{har}v_a - i_{har}v_{cm} + (I_{dc} + i_a)v_{cm} \\ p_n = -\frac{1}{2}i_a V_{dc} + I_{dc}v_a + \frac{1}{2}V_{dc}I_{dc} - v_a i_a + \\ \quad \frac{1}{2}i_{har}V_{dc} + i_{har}v_a + i_{har}v_{cm} - (I_{dc} - i_a)v_{cm} \end{cases} \quad (8)$$

The low frequency power can be compensated with a high frequency $v_{cm}$ by using:

$$\begin{cases} v_{cm} = \sin(\omega_{cm}t)\sqrt{2}\,V_{cm} \\ i_{har} = \dfrac{v_a i_a}{2V_{dc}} - I_{dc} + \sin(\omega_{cm}t)\sqrt{2}\,i_a\dfrac{2v_a^2/V_{dc} - 0.5V_{dc}}{2V_{cm}} \end{cases} \quad (9)$$

However, this method causes a zero-sequence current to the ground and the injected component has to be at a relatively higher frequency (e.g., above 1 kHz), so this method (without modification) is relatively unsuitable for 50 or 60 Hz grid-tie applications.

As discussed above, the power equations of the upper arm 201 and the lower arm 202 arm are shown in equation (1) for conventional control. The total output power of the two arms is a $2^{nd}$ order power:

$$p_p + p_n = -\frac{1}{2}I_d V_a \cos 2\omega t - \frac{1}{2}I_q V_a \sin 2\omega t, \quad (10)$$

where $I_d$ and $I_q$ represent the amplitude of active load current and the amplitude of reactive load current respectively. Thus $i_a = I_d \cos \omega t + I_q \sin \omega t$. At the same time, the load power equation is:

$$p_o = \frac{1}{2}V_a I_d + \frac{1}{2}V_o I_d \cos 2\omega t + \frac{1}{2}V_o I_q \sin 2\omega t, \text{ and} \quad (11)$$

the DC bus power equation is:

$$p_{in} = V_{dc}\frac{i_p + i_n}{2} = V_{dc}I_{dc}. \quad (12)$$

During conventional operation, the arm current can be expressed as:

$$\begin{cases} i_p = i_{dc} + i_a \\ i_n = i_{dc} - i_a \end{cases} \quad (13)$$

Using the modulation index $M=2\,V_a/V_{dc}$, the module power equations during conventional operation can be calculated as:

$$\begin{cases} p_p = \begin{array}{l} \frac{1}{2}I_d V_a\left(\frac{1}{M} - \frac{M}{2}\right)\cos\omega t - \frac{1}{4}I_d V_o \cos 2\omega t + \\ \frac{1}{2}I_q V_a\frac{1}{M}\sin\omega t - \frac{1}{4}I_q V_o \sin 2\omega t \end{array} \\ p_n = \begin{array}{l} -\frac{1}{2}I_d V_a\left(\frac{1}{M} - \frac{M}{2}\right)\cos\omega t - \frac{1}{4}I_d V_o \cos 2\omega t - \\ \frac{1}{2}I_q V_a\frac{1}{M}\sin\omega t - \frac{1}{4}I_q V_o \sin 2\omega t \end{array} \end{cases} \quad (14)$$

From equations (10), (11), and (12), it can be seen that the DC power provided to the load is from the DC bus, but the $2^{nd}$ order power provided to the load is from the switching submodules.

According to aspects of the embodiments, one method to substantially reduce the $2^{nd}$ order power of the switching submodules is to provide a component of $2^{nd}$ order power to the load. To achieve this purpose, the arm current can be adjusted to:

$$\begin{cases} i_p = I_{dc} + i_a + \frac{1}{4}MI_d\cos 2\omega t + \frac{1}{4}MI_q\sin 2\omega t \\ i_n = I_{dc} - i_a + \frac{1}{4}MI_d\cos 2\omega t + \frac{1}{4}MI_q\sin 2\omega t \end{cases} \quad (15)$$

A $2^{nd}$ order harmonic current is added to the control for both arm currents. Based on Kirchhoff's Current Law, $i_a = i_p - i_n$, the output current is not affected. The module power equation with $2^{nd}$ order current injection is given as:

$$\begin{cases} p_p = \frac{1}{2}I_d V_a\left[\begin{array}{l}\left(\frac{1}{M} - \frac{3M}{4}\right)\cos\omega t - \\ \frac{M}{4}\cos 3\omega t\end{array}\right] + \frac{1}{2}I_q V_a\left[\begin{array}{l}\left(\frac{1}{M} - \frac{M}{4}\right)\sin\omega t - \\ \frac{M}{4}\sin 3\omega t\end{array}\right] \\ p_n = -\frac{1}{2}I_d V_a\left[\begin{array}{l}\left(\frac{1}{M} - \frac{3M}{4}\right)\cos\omega t - \\ \frac{M}{4}\cos 3\omega t\end{array}\right] - \frac{1}{2}I_q V_a\left[\begin{array}{l}\left(\frac{1}{M} - \frac{M}{4}\right)\sin\omega t - \\ \frac{M}{4}\sin 3\omega t\end{array}\right] \end{cases} \quad (16)$$

From equation (16), it can be seen that the fundamental power is the major cause of capacitor voltage ripple. This fundamental power is inversely proportional to the modulation index when M<1.15. Specifically, when $$M = 1.15, \quad \frac{1}{M} - \frac{3M}{4} = 0,$$

the fundamental power related to $I_d$ can be significantly reduced in practice.

Figure 4A:
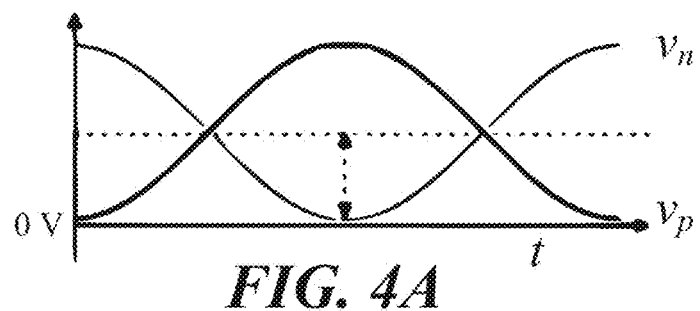
FIG. 4A illustrates an example output voltage of a half bridge switching submodule according to various examples described herein.
Figure 4B:
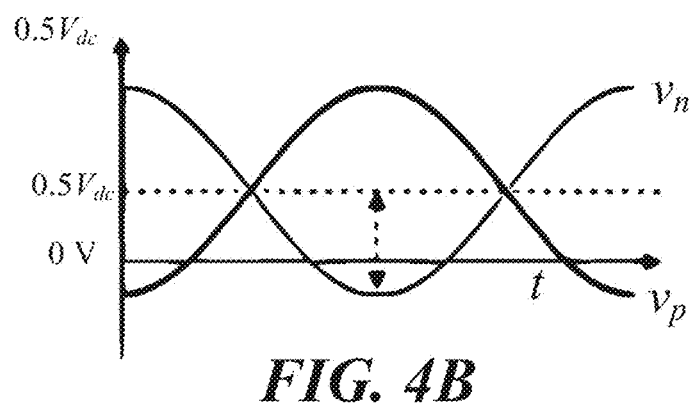
FIG. 4B illustrates an example output voltage of a full bridge or semi full bridge switching submodule according to various examples described herein.

However, M cannot be larger than 1 for half bridge switching submodules because half bridge switching submodules (e.g., the half bridge 220 in FIG. 2C) can only output positive voltages. As shown in FIG. 4A, the output voltage of a half bridge switching submodule does not fall below $V_{dc}$ or output a negative voltage with respect to $V_{dc}$. Thus, for a further reduction of capacitor voltage ripple, other topologies of switching submodules should be considered. According to aspects of the embodiments, bipolar topologies can be used because they are able to output negative voltages. When using the full bridge 230 or semi full bridge 240 in FIG. 2C, for example, M can be larger than 1, because a full bridge switching submodule has the ability to output negative voltages as shown in FIG. 4B.

Full bridge switching submodules can be especially useful under conventional control when the power factor is close to 1. For example, at unity power factor condition, $i_a = I_d \cos \omega t$, the module power under conventional control is:

$$\begin{cases} p_p = i_p v_p = \frac{1}{2}I_d V_a\left(\frac{1}{M} - \frac{M}{2}\right)\cos\omega t - \frac{1}{4}I_d V_a \cos 2\omega t \\ p_n = i_n v_n = -\frac{1}{2}I_d V_a\left(\frac{1}{M} - \frac{M}{2}\right)\cos\omega t - \frac{1}{4}I_d V_a \cos 2\omega t \end{cases} \quad (17)$$

One example concept for capacitor voltage ripple reduction according to the embodiments is to use full bridge switching submodules in an MMC, to design the MMC controller for M to be about 1.15, and to inject a $2^{nd}$ order current. In that case, the arm current can be controlled as:

$$\begin{cases} i_p = I_{dc} + i_a + \frac{1}{4}MI_d\cos2\omega t \\ i_n = I_{dc} - i_a + \frac{1}{4}MI_d\cos2\omega t \end{cases} \quad (18)$$

By the injected $2^{nd}$ order current, the module power can be represented as:

$$\begin{cases} p_p = \frac{1}{2}I_d V_a\left[\left(\frac{1}{M} - \frac{3M}{4}\right)\cos\omega t - \frac{M}{4}\cos3\omega t\right] \\ p_n = -\frac{1}{2}I_d V_a\left[\left(\frac{1}{M} - \frac{3M}{4}\right)\cos\omega t - \frac{M}{4}\cos3\omega t\right] \end{cases} \quad (19)$$

By selecting M to be about 1.15, the fundamental part can be significantly reduced in practice. Then, the reduced module power is:

$$\begin{cases} p_p = -\frac{1.15}{8}I_d V_a\cos3\omega t \\ p_n = \frac{1.15}{8}I_d V_a\cos3\omega t \end{cases}, \text{ so that} \quad (20)$$

only a relatively small third $3^{rd}$ component exists in the module power.

Figure 5B:
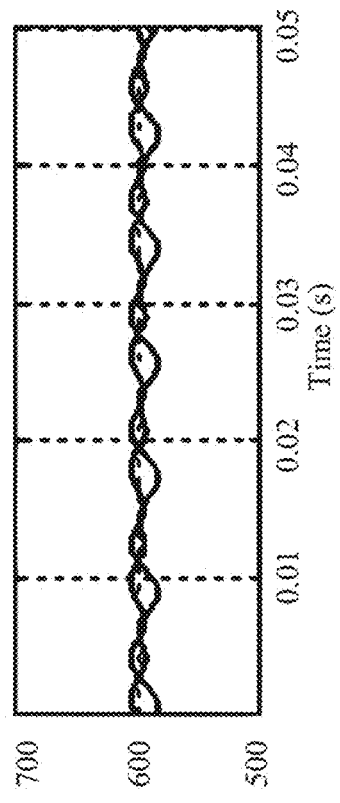
FIGS. 5A and 5B illustrate a simulation of capacitor voltage ripple before and after the application of feedback control based on a target modulation index of 1.15 and $2^{nd}$ order current injection according to various aspects of the embodiments.
Figure 5A:
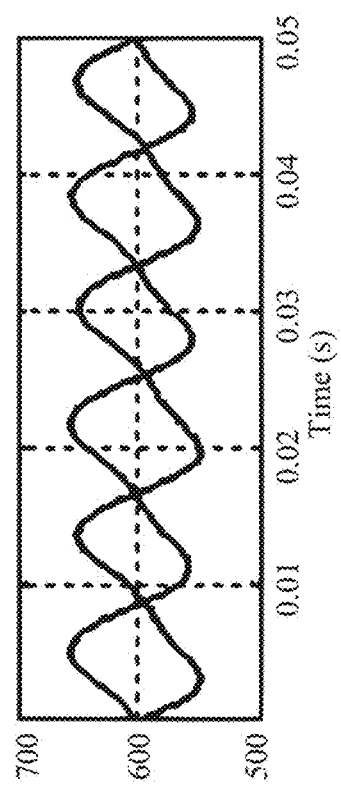

FIGS. 5A and 5B illustrate a simulation of capacitor voltage ripple before and after the application of a feedback control where M is 1.15 and $2^{nd}$ order current is injected according to various aspects of the embodiments. The simulation result shows about 88% reduction of the fundamental component of capacitor voltage ripple and a 76% reduction of the $2^{nd}$ order harmonic. Together, a reduction of about 78% of the capacitor voltage ripple was achieved.

Thus, the embodiments include the design of MMCs that incorporate bipolar topologies of switching submodules and MMC controllers configured to control the modulation index to be larger than 1 and inject a $2^{nd}$ order circulating harmonic current. The above-referenced ranges of modulation indexes and injected circulating harmonic currents are only provided as examples, as other values and ranges can be used to reduce capacitor voltage ripple. Overall, when the modulation index is fluctuating around about 1.15 and the injected $2^{nd}$ order circulating harmonic current is fluctuating around $I_d \cos 2\omega t$, there is significant effect of capacitor voltage ripple reduction.

To achieve modulation indexes over 1, bipolar topologies of switching submodules can be used in MMCs. The full bridge and semi bridge topologies are two examples of bipolar topologies of switching submodules that can be used in MMCs to achieve modulation indexes over 1. The concepts described herein are applicable at any power factor, although the reduction of capacitor voltage ripple is more significant when the power factor is closer to 1. When the power factor is not unity, the injected current would have an angle:

$$\begin{cases} i_p = I_{dc} + i_a + \frac{1}{4}MI_d\cos(2\omega t + \varphi) \\ i_n = I_{dc} - i_a + \frac{1}{4}MI_d\cos(2\omega t + \varphi) \end{cases} \quad (21)$$

In other aspects of the embodiments, it is recognized that half bridge switching submodules (e.g., the half bridge 220 in FIG. 2C) have the benefit of low conduction loss, whereas full bridge switching submodules (e.g., the full bridge 230 in FIG. 2C) have DC fault clearing capability. In that context, the concepts described herein can be applied to hybrid MMC structures including a combination of half bridge and full bridge switching submodules. In that case, the hybrid MMC can exhibit reasonable loss with DC fault clearing capability.

Referring back to FIGS. 2A and 2B, assuming that each of the upper arm 201 and the lower arm 202 includes m half bridge switching submodules and n full bridge switching submodules that equally share or balance voltage across the arms, the voltage for each half bridge submodule, $v_h$, and full-bridge submodule, $v_f$, are given by:

$$v_h = \frac{1}{m+n}\frac{V_0}{M}[1 - M\cos(\omega t)]\text{ and} \quad (22)$$

$$v_f = v_h = \frac{1}{m+n}\frac{V_o}{M}[1 - M\cos(\omega t)]. \quad (23)$$

The total module voltage is given by:

$$mv_h + nv_f = \frac{V_o}{M}[1 - M\cos(\omega t)]. \quad (24)$$

Since the output voltage of each half bridge submodule is always greater than zero, M is always less than 1 given a half bridge only topology. However, because capacitor voltage ripple can be significantly reduced when M>1 as described herein, another aspect of the embodiments is inject a voltage to each switching submodule such that M can be greater than 1 while $v_h$ is still always greater than zero. The injection of a $3^{rd}$ order harmonic is demonstrated as an example.

With a $3^{rd}$ order harmonic injection, the switching submodule voltages are given by:

$$v'_h = \frac{1}{m+n}\frac{V_o}{M}[1 - M\cos(\omega t) + xM\cos(3\omega t)] \text{ and} \quad (25)$$

$$v'_f = \frac{1}{m+n}\frac{V_o}{M}\left[1 - M\cos(\omega t) - \frac{m}{h}xM\cos(3\omega t)\right]. \quad (26)$$

Figure 6:
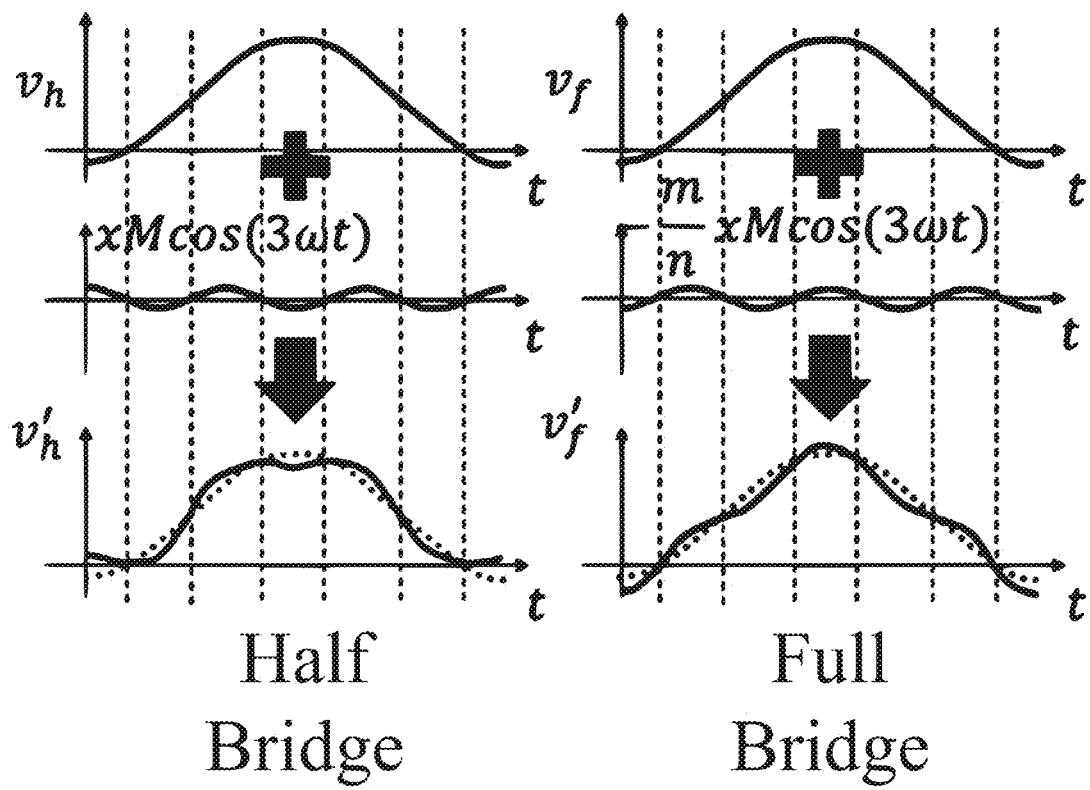
FIG. 6 illustrates the concept of $3^{rd}$ order harmonic voltage injection in a hybrid MMC according to various aspects of the embodiments.

The total module voltage given by:

$$mv'_h + nv'_f = \frac{V_0}{M}[1 - M\cos(\omega t)] \quad (27)$$

remains the same. With the help from the full bridge switching submodules, M now can be greater than 1 while $v'_h$ is still always greater than 0. FIG. 6 illustrates the concept of $3^{rd}$ order harmonic injection in a in hybrid MMC according to various aspects of the embodiments.

Figure 7A:
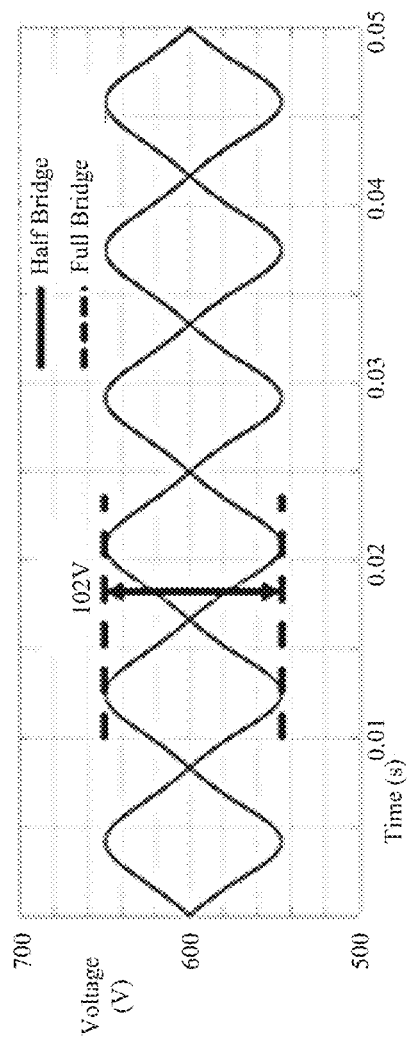
FIGS. 7A and 7B illustrate simulated capacitor voltage ripple results for an MMC having at least one half bridge switching submodule and at least one full bridge switching submodule per arm according to various aspects of the embodiments.
Figure 7B:
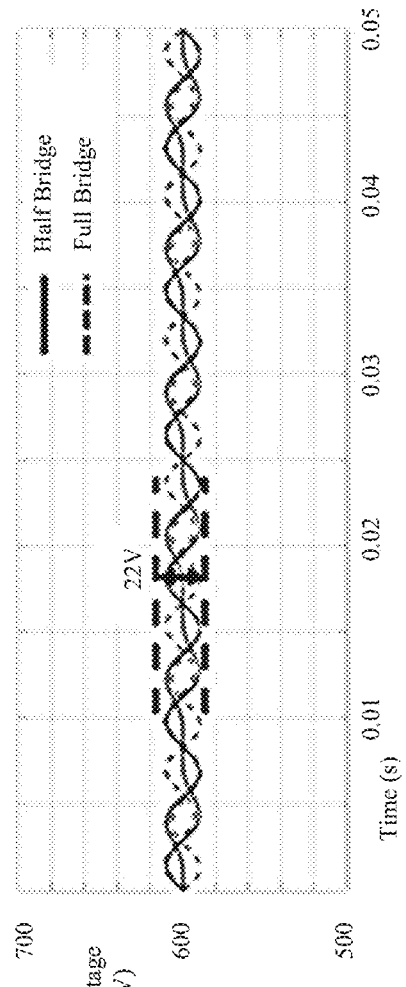

FIGS. 7A and 7B illustrate simulated capacitor voltage ripple results for an MMC having one half bridge switching submodule and one full bridge switching submodule per arm according to various aspects of the embodiments. In FIG. 7A, M=0.8 without $3^{rd}$ order harmonic injection. In FIG. 7B, M>1 with $3^{rd}$ order harmonic injection. As shown, the capacitor voltage ripple is significantly reduced in FIG. 7B.

Figure 8:
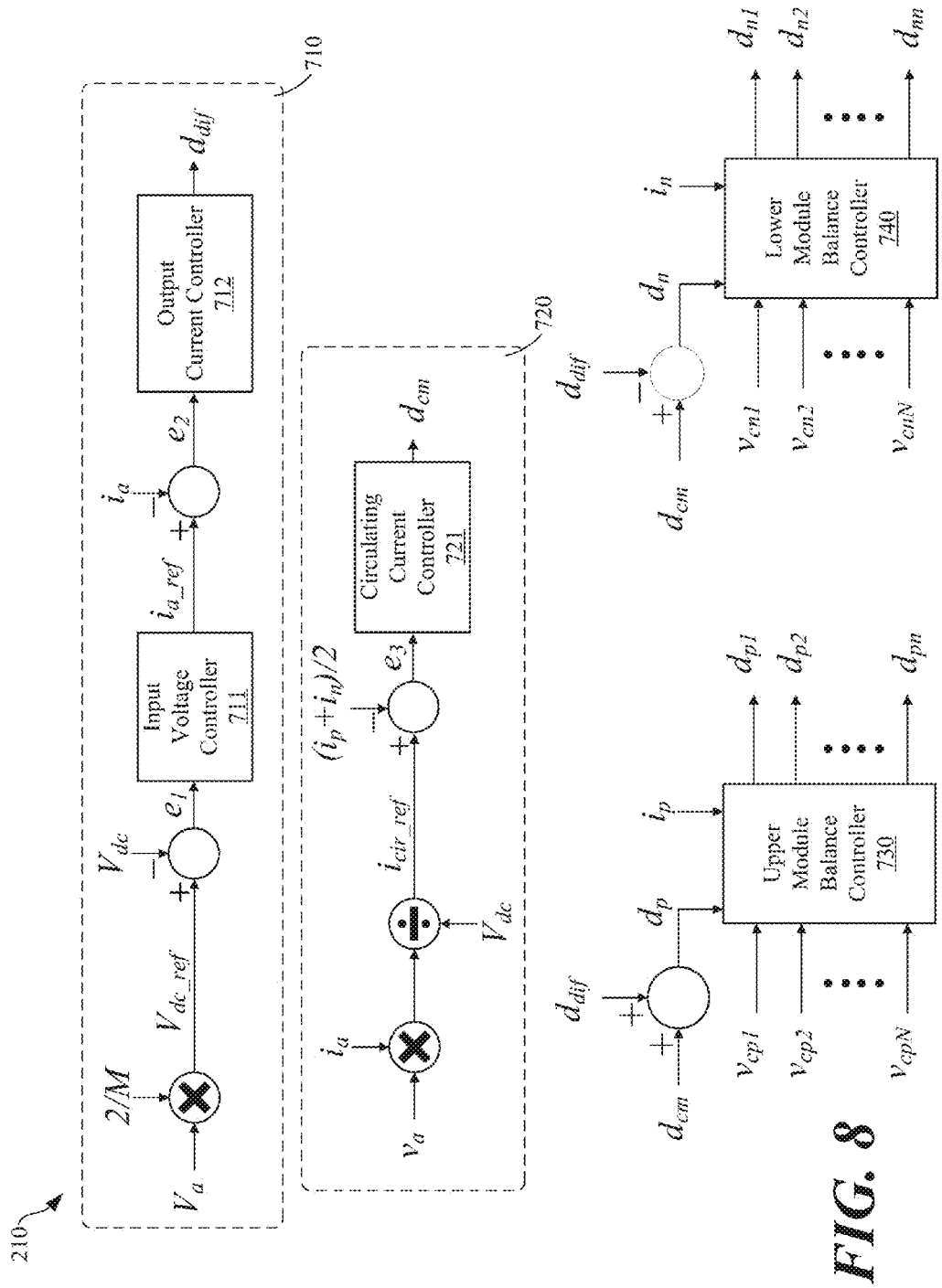
FIG. 8 illustrates example logical components of an MMC controller for capacitor voltage ripple reduction in the MMC shown in FIG. 2A according to various aspects of the embodiments.

FIG. 8 illustrates example logical components of the MMC controller 210 for capacitor voltage ripple reduction in the MMC 102 shown in FIG. 2A according to various aspects of the embodiments. The MMC controller 210 includes a control feedback loop to develop the switching control signals for the switching power transistors in the SMp1-SMpN and SMn1-SMnN switching submodules. The individual voltage and current controllers in the MMC controller 210 can be embodied as PI controllers implemented in hardware, firmware, software, or a combination thereof. As shown in FIG. 8, the MMC 102 includes a differential mode loop 710, a common mode loop 720, an upper module balance controller 730, and a lower module balance controller 740.

The differential mode loop 710 is configured to generate a voltage reference $V_{dc\_ref}$ based on the magnitude or envelope $V_a$ of the output voltage $v_a$ and the target modulation index M. In the example shown in FIG. 8, the generation of the voltage reference $V_{dc\_ref}$ is based on the $M=-2V_a/V_{dc}$ relationship described herein, although other relationships can be used in other embodiments. According to aspects of the embodiments, M can be set at a suitable value greater than 1. As one example, at unity power factor, M can be selected at 1.15. If the MMC 102 is AC grid tied, the AC voltage output may be fixed by the requirements of the power grid. In that case, a proper DC voltage reference can be calculated based on M.

Based in part on the target modulation index M, the differential mode loop 710 is configured to determine the difference or error $e_1$ between the voltage reference $V_{dc\_ref}$ and the input voltage reference $V_{dc}$, and provide the error $e_1$ to the input voltage controller 711. The input voltage controller 711 is configured to generate an output current reference $i_{a\_ref}$. The differential mode loop 710 is further configured to determine the difference or error $e_2$ between the output current reference $i_{a\_ref}$ and the output current $i_a$, and provide the error $e_2$ to the output current controller 712. The output current controller 712 is configured to generate a differential control signal $d_{dif}$ for controlling the power switches in the switching submodules SMp1-SMpN and SMn1-SMnN.

The common mode loop 720 is configured to determine a circulating current reference $i_{cir\_ref}$ based on the output voltage $v_a$, the output current $i_a$, and the input voltage $V_{dc}$. The circulating current reference $i_{cir\_ref}$ is equal to $$\frac{v_a i_a}{V_{dc}} = I_{dc} + \frac{1}{4}MI_d\cos 2\omega t + \frac{1}{4}MI_q\sin 2\omega t.$$

At unity power factor $$i_{cir\_ref} = \frac{v_a i_a}{V_{dc}} = I_{dc} + \frac{1}{4}MI_d\cos 2\omega t.$$

In that case, the $2^{nd}$ order current is injected to reduce capacitor voltage ripple.

The common mode loop 720 is further configured to determine the difference or error $e_3$ between the circulating current reference $i_{cir\_ref}$ and the common part of the current that flows through the upper arm 201 and the lower arm 202, referred to as the circulating current $i_{cir}$. The error $e_3$ is provided to the circulating current controller 721. The circulating current controller 721 is configured to generate a common mode control signal $d_{cm}$ for controlling the power switches in the switching submodules SMp1-SMpN and SMn1-SMnN.

As also shown in FIG. 8, the differential control signal $d_{dif}$ is added to the common mode control signal $d_{cm}$ and provided to the upper module balance controller 730 as the upper arm control signal $d_p$. Further, the differential control signal $d_{dif}$ is subtracted from the common mode control signal $d_{cm}$ and provided to the lower module balance controller 740 as the lower arm control signal $d_n$. The upper module balance controller 730 is configured to generate the switching control signals $d_{p1}$-$d_{pN}$ to control the switching power transistors in the switching submodules SMp1-SMpN. The upper module balance controller 730 generates the switching control signals $d_{p1}$-$d_{pN}$ with reference to the voltages $V_{cp1}$-$V_{cpN}$ across the capacitors in the switching submodules SMp1-SMpN (see, e.g., FIG. 2B) and the current $i_p$ through the upper arm 201. The lower module balance controller 740 is configured to generate the switching control signals $d_{n1}$-$d_{nN}$ to control the switching power transistors in the switching submodules SMn1-SMnN. The lower module balance controller 740 generates the switching control signals $d_{n1}$-$d_{nN}$ with reference to the voltages $V_{cn1}$-$V_{cnN}$ across the capacitors in the switching submodules SMn1-SMnN (see, e.g., FIG. 2B) and the current $i_n$ through the lower arm 202.

As noted above, half bridge switching submodules (e.g., the half bridge 220 in FIG. 2C) have the benefit of low conduction loss, whereas full bridge switching submodules (e.g., the full bridge 230 in FIG. 2C) have DC fault clearing capability. Thus, the concepts described herein can be applied to hybrid MMC structures including a combination of half bridge and full bridge switching submodules. In that context, FIG. 9 illustrates a variation on the logical components of the MMC controller shown in FIG. 8.

Figure 9:
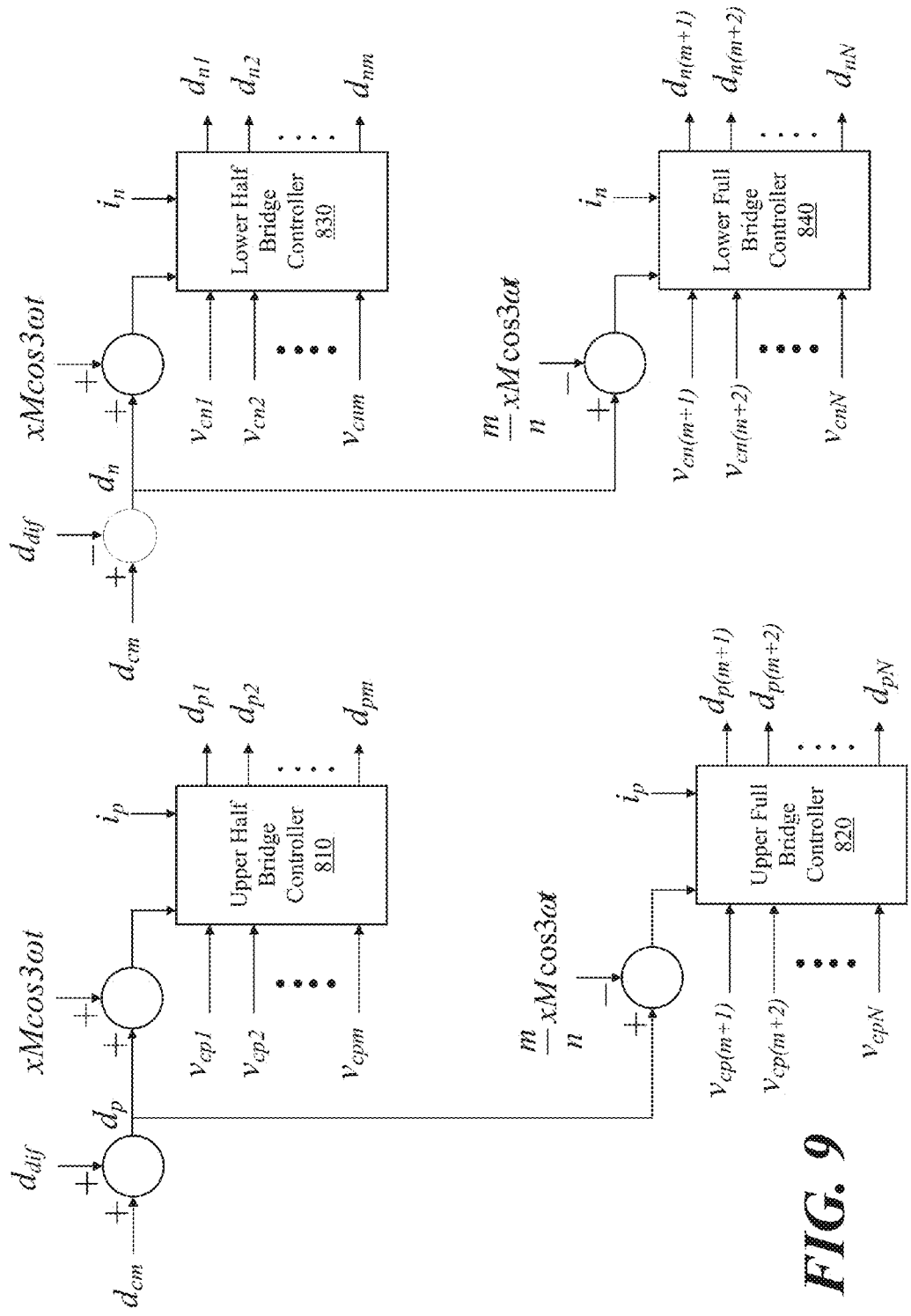
FIG. 9 illustrates a variation on the logical components of the MMC controller shown in FIG. 8 according to various aspects of the embodiments.

For the control concepts illustrated in FIG. 9, it can be assumed that each of the upper arm 201 and the lower arm 202 includes m half bridge switching submodules and n full bridge switching submodules. In that case, the voltage for each half bridge submodule, $v_h$, and the voltage of each full-bridge submodule, $v_f$, are given by equations (22) and (23) above. To acheive the reduction of capacitor voltage ripple with M>1 in a hybrid MMC structure, the embodiments include the injection of a voltage to each switching submodule such that M can be greater than 1. One example of the injection of a $3^{rd}$ order harmonic voltage is demonstrated in equations (25) and (26) above.

To achieve the injection of a $3^{rd}$ order harmonic voltage in an MMC controller for a hybrid MMC, FIG. 9 illustrates an upper half bridge controller 810, an upper full bridge controller 820, a lower half bridge controller 830, and a lower full bridge controller 840. The controllers 820, 830, 840, and 850 can be provided in place of the balance controllers 730 and 740 shown in FIG. 8 for a hybrid MMC. The upper half bridge controller 810 is configured to generate switching control signals to control the switching power transistors in the half bridge switching submodules in the upper arm 201, and the upper full bridge controller 820 is configured to generate switching control signals to control the switching power transistors in the full bridge switching submodules in the upper arm 201. Similarly, the lower half bridge controller 830 is configured to generate switching control signals to control the switching power transistors in the half bridge switching submodules in the lower arm 202, and the lower full bridge controller 840 is configured to generate switching control signals to control the switching power transistors in the full bridge switching submodules in the lower arm 202.

As also shown in FIG. 9, the differential control signal $d_{dif}$ is added to the common mode control signal $d_{cm}$ and to provide the upper arm control signal $d_p$, and the differential control signal $d_{dif}$ is subtracted from the common mode control signal $d_{cm}$ to provide the lower arm control signal $d_n$. Before being provided to the upper half bridge controller 810 and the upper full bridge controller 820, however, the $3^{rd}$ order harmonic voltage $\times M \cos(3\omega t)$ is injected into the upper arm control signal $d_p$. Similarly, before being provided to the lower half bridge controller 830 and the lower full bridge controller 840, however, the $3^{rd}$ order harmonic voltage $m/n \times M \cos(3\omega t)$ is injected into the lower arm control signal $d_n$.

The components described herein, including the MMC controllers can be embodied in the form of hardware, firmware, software executable by hardware, or as any combination thereof. If embodied as hardware, the components described herein can be implemented as a collection of discrete analog, digital, or mixed analog and digital circuit components. The hardware can include one or more discrete logic circuits, microprocessors, microcontrollers, or digital signal processors (DSPs), application specific integrated circuits (ASICs), programmable logic devices (e.g., field-programmable gate array (FPGAs)), or complex programmable logic devices (CPLDs)), among other types of processing circuitry.

The microprocessors, microcontrollers, or DSPs, for example, can execute software to perform the control aspects of the embodiments described herein. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A power converter, comprising:
   a modular multilevel converter (MMC) electrically coupled between a first power system and a second power system, the MMC comprising:
      a phase leg comprising a cascade arrangement of switching submodules, the switching submodules comprising an arrangement of switching power transistors and capacitors; and
      a controller to reduce voltage ripple on the capacitors in the switching submodules, the controller comprising:
         a differential control loop configured to generate a differential control signal for switching the switching power transistors based on a target modulation index; and
         a common mode control loop configured to generate a common mode control signal for switching the switching power transistors based on an injection of a $2^{nd}$ order harmonic current as an input to the controller according to a power factor of the MMC.

2. The power converter according to claim 1, wherein the control loop is configured to reduce both fundamental and $2^{nd}$ order harmonic components of voltage ripple on the capacitors in the switching submodules.

3. The power converter according to claim 1, wherein:
   the first power system comprises a direct current (DC) power system having an output voltage of $V_{dc}$;
   the second power system comprises an alternating current (AC) power system having an envelope output voltage of $V_a$; and
   the target modulation index, M, is defined as $M=2V_a/V_{dc}$.

4. The power converter according to claim 3, wherein the switching submodules comprise at least one of a full bridge arrangement or a semi full bridge arrangement of a subset of the switching power transistors, and M is greater than about 1.

5. The power converter according to claim 3, wherein the switching submodules comprise at least one of a full bridge arrangement or a semi full bridge arrangement of a subset of the switching power transistors, and M is about 1.15.

6. The power converter according to claim 1, wherein the control loop further comprises an upper switching submodule balance controller and a lower switching submodule balance controller.

7. The power converter according to claim 1, wherein the $2^{nd}$ order harmonic current comprises an angle component at a non-unity power factor of the MMC.

8. The power converter according to claim 1 wherein:
   a first of the switching submodules comprises a full bridge arrangement of a first subset of the switching power transistors;
   a second of the switching submodules comprises a half bridge arrangement of a second subset of the switching power transistors; and
   the control loop is further configured to inject a $3^{rd}$ order harmonic voltage into a combination of the differential control signal and the common mode control signal.

9. The power converter according to claim 1, wherein the switching submodules comprise a first switching submodule having a full bridge arrangement of a first subset of the switching power transistors and a half bridge arrangement of a second subset of the switching power transistors.

10. A power converter system, comprising:
    a direct current (DC) power system;
    an alternating current (AC) power system; and
    a modular multilevel converter (MMC) electrically coupled and configured to convert power between the DC power system and the AC power system, the MMC comprising:
       a phase leg comprising a cascade arrangement of switching submodules, the switching submodules comprising an arrangement of switching power transistors and capacitors; and
       a controller to reduce voltage ripple on the capacitors in the switching submodules, the controller comprising:

a differential control loop configured to generate a differential control signal for switching the switching power transistors based on a target modulation index; and a common mode control loop configured to generate a common mode control signal for switching the switching power transistors based on an injection of a $2^{nd}$ order harmonic current as an input to the controller according to a power factor of the MMC.

11. The power converter system according to claim 10, wherein the target modulation index, M, is defined as $M=2V_a/V_{dc}$.

12. The power converter system according to claim 11, wherein the switching submodules comprise at least one of a full bridge arrangement or a semi full bridge arrangement of a subset of the switching power transistors, and M is about 1.15.

13. The power converter system according to claim 10, wherein the control loop further comprises an upper switching submodule balance controller and a lower switching submodule balance controller.

14. The power converter system according to claim 10, wherein the $2^{nd}$ order harmonic current comprises an angle component at a non-unity power factor of the MMC.

15. The power converter system according to claim 10, wherein:
a first of the switching submodules comprises a full bridge arrangement of a first subset of the switching power transistors;
a second of the switching submodules comprises a half full bridge arrangement of a second subset of the switching power transistors; and
the control loop is further configured to inject a $3^{rd}$ order harmonic voltage into a combination of the differential control signal and the common mode control signal.

16. The power converter system according to claim 10, wherein the switching submodules comprise a first switching submodule having a full bridge arrangement of a first subset of the switching power transistors and a half bridge arrangement of a second subset of the switching power transistors.

17. A modular multilevel converter (MMC), comprising:
a phase leg comprising a cascade arrangement of switching submodules, the switching submodules comprising an arrangement of switching power transistors and capacitors; and
a control loop to reduce $2^{nd}$ order harmonic components of voltage ripple on the capacitors in the switching submodules, the controler comprising:
a differential mode control loop configured to generate a differential control signal for switching the switching power transistors based on a target modulation index to reduce fundamental components of voltage ripple on the capacitors in the switching submodules; and
a common mode control loop configured to generate a common mode control signal for switching the switching power transistors based on an injection of a $2^{nd}$ order harmonic current as an input to the control loop according to a power factor of the MMC.

18. The MMC according to claim 17, wherein:
the MMC is electrically coupled between a first power system and a second power system
the first power system comprises a direct current (DC) power system having an output voltage of $V_{dc}$;
the second power system comprises an alternating current (AC) power system having an envelope output voltage of $V_a$; and
the target modulation index, M, is defined as $M=2V_a/V_{dc}$.

19. The MMC according to claim 18, wherein the switching submodules comprise at least one of a full bridge arrangement or a semi full bridge arrangement of a subset of the switching power transistors, and M is greater than about 1.

20. The MIVIC according to claim 17, wherein:
a first of the switching submodules comprises a full bridge arrangement of a first subset of the switching power transistors;
a second of the switching submodules comprises a half full bridge arrangement of a second subset of the switching power transistors; and
the control loop is further configured to inject a $3^{rd}$ order harmonic voltage into a combination of the differential control signal and the common mode control signal.

* * * * *